United States Patent [19]
Wood et al.

[11] Patent Number: 5,471,387
[45] Date of Patent: Nov. 28, 1995

[54] METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM

[75] Inventors: James A. Wood, Spartanburg; David A. Greer, Simpsonville, both of S.C.

[73] Assignee: Westinghouse Air Brake Company, Wilmerding, Pa.

[21] Appl. No.: 228,660

[22] Filed: Apr. 18, 1994

[51] Int. Cl.⁶ .................................................. B60T 8/00
[52] U.S. Cl. .................................... 364/426.03; 180/197
[58] Field of Search ...................... 364/426.03, 426.02; 180/197; 361/238; 303/100, 103, 95

[56] References Cited

U.S. PATENT DOCUMENTS

| | | | |
|---|---|---|---|
| 3,482,887 | 12/1969 | Sheppard | 303/21 |
| 4,071,282 | 1/1978 | Callahan et al. | 303/106 |
| 4,298,940 | 11/1981 | Tadokoro et al. | 364/426 |
| 4,347,569 | 8/1982 | Allen, Jr. et al. | 364/426 |
| 4,410,947 | 10/1983 | Strong et al. | 364/426 |
| 4,486,839 | 12/1984 | Mazur et al. | 364/426 |
| 4,941,099 | 7/1990 | Wood et al. | 364/426.02 |
| 4,987,543 | 1/1991 | Wood et al. | 364/426.03 |
| 5,244,171 | 9/1993 | Drake et al. | 246/168.1 |
| 5,280,718 | 1/1994 | Drake et al. | 73/129 |
| 5,290,095 | 3/1994 | Wood et al. | 303/92 |

*Primary Examiner*—Kevin J. Teska
*Assistant Examiner*—Stephen J. Walder, Jr.
*Attorney, Agent, or Firm*—J. O. Ray, Jr.

[57] ABSTRACT

A method of and an apparatus for controlling wheel slip in a railway vehicle brake system which includes: determining whether the axle rate is in the slippage range, and generating a first output logical signal indicative thereof; comparing the axle rate and the first output logical signal to determining an energy summation value indicative of the wheel/axle set's loss of energy due to braking wheel slippage, and generating an energy summation signal indicative thereof; determining an energy loss limit and generating an energy loss limit signal at which wheel slippage has little potential for self correction; comparing the energy summation signal and the energy loss limit signal to generate a second logical output signal indicative of whether the wheel/axis set is in a slip condition that needs correction; comparing the axle rate signal, the energy summation signal and the second logical output signal to generate a wheel slip intensity signal; converting the wheel slip intensity signal to a command signal; and utilizing the command signal in a force modulation interface to vary the rate of braking force reduction.

20 Claims, 1 Drawing Sheet

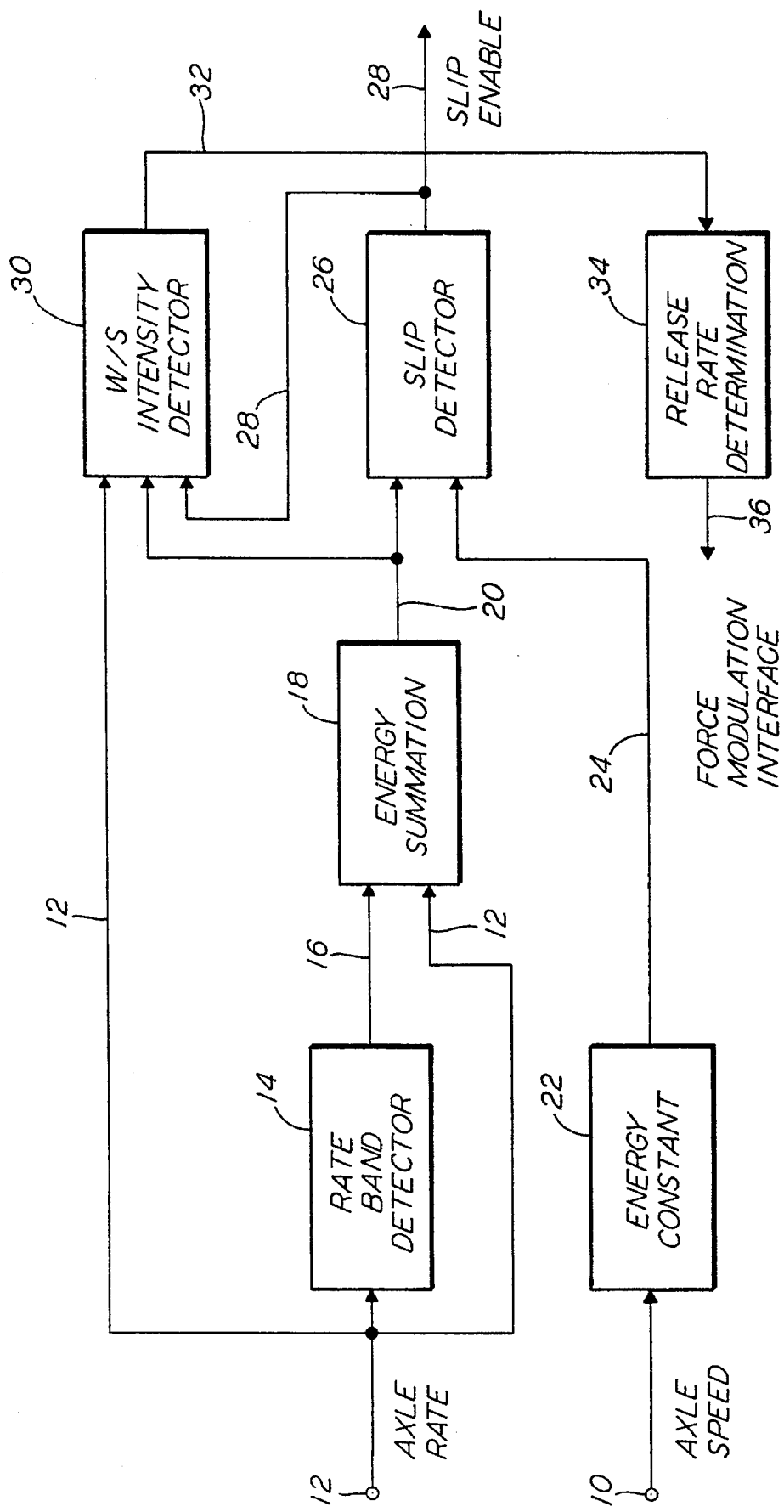

METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM

FIELD OF THE INVENTION

This invention relates, in general, to a wheel slip control system for a passenger transit railway and/or other similar type vehicles, and, more specifically, this invention relates to both a method and apparatus which includes a combination of wheel slip control detection and wheel slip intensity determination. By including a wheel slip intensity determination, the system is a full range detection system that allows fast through slow breakaway wheel slip detection. The system lends itself to microprocessor applications, and is well suited to use with pattern recognition adhesion adaptive wheel control systems.

BACKGROUND OF THE INVENTION

It has been found that, when the brakes of a transit vehicle of a railway train consist are applied, the braking force must be properly controlled in order to safely and efficiently slow down and/or stop the vehicle or train at a station or the like. For a given running surface condition, the force between the wheel tread and the running surface or track increases during the initial stages of slippage. As slippage increases the slip value moves toward the a critical wheel slip value. When the value of the wheel slip increases beyond such critical slip value, the force between the wheel tread and the running surface decreases. It will be appreciated that stable and effective braking occurs when the slip value is either equal to or less than the critical slip value. Thus, when a slip value becomes greater than the critical slip value, the braking becomes unstable and can result in a sudden wheel lockup which can not only cause excessive wheel and running surface wear and wheel flattening, but will increase the actual stopping distance. Accordingly, in the braking operation, it is advantageous to detect an incipient wheel lockup by continuously monitoring the wheel slip value between the wheel tread and the running surface and in order to reduce and/or control the braking force being applied to the extent necessary to achieve the maximum possible braking effort without causing wheel lockup.

A prior art type wheel-slip control system is shown and disclosed in U.S. Pat. No. 4,491,920, issued on Jan. 1, 1985, entitled "Rate Polarity Shift Wheel-Slip Control System", which is assigned to the assignee of the present invention, and the teachings therein are incorporated herein by reference thereto in the present application. Briefly, the wheel-slip control in that patented system is for a multiple-truck vehicle and includes a speed sensor for generating signals representative of the velocity of each of the wheel axle units. A differentiator is connected to each of the speed sensors for differentiating the velocity signals to obtain a rate signal. A rate determining circuit determines the most negative-going rate signal of each of the wheel axle units of each truck. A plurality of deceleration threshold and rate direction detectors and data processing logic initiate a brake force reduction action on the truck experiencing a wheel slip, and a positive logic "OR" gate senses a polarity shift in the most negative rate signal to cause the data processing logic to reapply a braking action.

A more recent prior art wheel-slip control system is shown and disclosed in our U.S. Pat. No. 4,941,099, issued on Jul. 10, 1990, entitled "Electronic Adhesion Adaptive Wheel Slide Protection Arrangement Function", which is also assigned to the assignee of this invention, and is also incorporated herein by reference thereto. Pursuant to that patented system, a distinct and separate speed varying rate detection circuit and an energy storage slip detection circuit are provided, with the speed varying rate detection circuit being a part of a primary wheel slip detection system, while the energy storage slip detection circuit is a part of a synchronous wheel slip detection system. Each detection circuit is interfaced with its own separate pattern recognition logic, which are then tied together through a relatively complex brake force modulation scheme.

Accordingly, the above patented system uses two separate detection systems, with each detection system requiring a separate slip control logic, which then must be tied together with a rather complex force modulation scheme. In addition, the above described patented system uses a single energy storage level set point which limits the effectiveness of the system to a particular speed range, and is, therefore, normally used only for fast breakaway slippage, and is sometimes prone to over sensitivity.

SUMMARY OF THE INVENTION

The present invention provides an apparatus and process for a wheel slip control detection and combines therewith, a wheel slip intensity determination function. By measuring and incorporating the variable energy storage slip value, as opposed to utilizing a predetermined set point, a full range detection system results for fast through slow breakaway wheel slip detection. By combining the two functions, the variable energy storage factor also minimizes the possibility of over sensitivity. Incorporation of a wheel slip intensity determination function also allows the force reduction modulation to be calibrated to the intensity of the wheel slippage without the need for complex force modulation logic. By combining the two functions, the system requires only one slip control logic and thereby reduces the necessary hardware and/or software code needed to implement the detection logic. Although the process can be implemented through use of discrete circuits, it readily lends itself to microprocessor applications, and is well suited for use with a number of different types of slip control logic including both simple and complex wheel slip control logic schemes, and can be adapted to a variety of force modulation systems.

In a system using a variable force reduction rate approach, for example, the apparatus will include a rate band detector responsive to an axle rate signal and a preset deceleration rate level, to produce a first output logical signal of "0" or "1" and an energy summation means responsive to the output logical signal of the rate band detector to produce an energy summation output signal. An energy constant means is also provided, which is responsive to an axle speed signal to produce an energy constant signal defining an energy loss limit having a numerical value no greater than zero, and a slip detector, responsive to the energy summation signal and the energy constant signal to produce a second logical signal of "0" or "1". A wheel slip intensity detector is also provided which is responsive to the axle rate signal, the energy summation output signal and the second logical signal, to produce a wheel slip intensity output signal having a value of "0" if the second logical output signal is "0", and if the second logical signal is "1", this intensity output signal will have a value equal to the axle rate signal. Lastly, a release rate determination means is provided which is responsive to the wheel slip intensity output signal to convert the wheel slip intensity output signal to a command signal which is used to vary the rate of braking force reduction.

OBJECTS OF THE INVENTION

It is, therefore, one of the primary objects of the present invention to provide a method of and an apparatus for a new and improved wheel slip detection system for controlling the braking system on a passenger transit railway and/or other similar type vehicle.

Another object of the present invention is to provide a method of and an apparatus for providing a combination system of speed varying energy level wheel slip detection and wheel slip intensity determination in a system for controlling the brake system on a passenger transit railway and/or other similar type vehicle, which permits fast through slow breakaway wheel slip detection.

A further object of the present invention is to provide a method of and an apparatus for combining a speed rate detection function and storage slip detection function within a single system for controlling a brake system on a passenger transit railway and/or other similar type vehicle which is not prone to over sensitivity.

Still another object of the present invention is to provide a method of and an apparatus for combining a speed rate detection function and storage slip detection function within a single system for controlling a brake system on a passenger transit railway and/or other similar type vehicle which is effective over any speed range.

A further object of the present invention is to provide a method of and an apparatus for combining a speed rate detection function and storage slip detection function within a single system for controlling a brake system on a passenger transit railway and/or other similar type vehicle which minimizes the logic necessary and reduces the hardware and/or software needed to implement the detection logic.

A still further object of the present invention is to provide a method of and an apparatus for combining a speed rate detection function and storage slip detection function within a single system for controlling a brake system on a passenger transit railway and/or other similar type vehicle which does not require the incorporation therein of a complex force modulation logic.

Still another object of the present invention is to provide a method of and an apparatus for combining a speed rate detection function and storage slip detection function within a single system for controlling a brake system on a passenger transit railway and/or other similar type vehicle which can be used with a number of different types of wheel slip control logic, and can be adapted to a variety of force modulation approaches.

In addition to the numerous objects and advantages described with particularity above, various other objects and advantages of the instant invention will become more readily apparent to those persons who are skilled in the passenger transit brake control art from the following more detailed description of the invention, particularly, when such description is taken in conjunction with the attached drawing and the appended claims.

BRIEF DESCRIPTION OF THE DRAWING

The attached figure is a schematic diagram of a presently preferred embodiment of the invention.

BRIEF DESCRIPTION OF A PRESENTLY PREFERRED AND ALTERNATIVE EMBODIMENTS OF THE INVENTION

Prior to proceeding with the more detailed description of the invention, it should be noted that although the invention will be described as a system utilizing a variable force reduction rate approach, which includes a rate band detector, an energy summation means, an energy constant means, a slip detector, a wheel slip intensity detector, and a release rate determination means, it should be understood that any such detectors and means can be readily used by persons skilled in the art whether electronic or otherwise, and that such a person skilled in the art could apply this approach to other force modulation systems. In addition, the terms "device" or "means" as used herein may be either a discrete electrical or electronic circuit or a portion of a microprocessor.

It should be further noted that the system, according to the present invention, is intended to be used as a system for controlling the barking forces on any given wheel/axle combination being monitored. Pursuant to conventional prior art practices, any such wheel/axle combination being monitored will be provided with an individual speed pickup (not shown) which will provide an axle speed signal indicative of the rotational speed of the wheel/axle being so monitored. It is this axle speed signal which is utilized to activate the system of this invention.

The presently preferred embodiment of this invention utilizes a number of process input and output signals to achieve effective vehicle brake control with respect to a particular wheel/axle set being monitored. As noted above, one of these signals is the axle speed signal 10, provided by the speed pickup (not shown). Another of one these signals is the axle rate signal 12, which is the acceleration/deceleration of the wheel/axle set being monitored for slippage. This axle rate signal 12 is developed by the invention from the differentiation of the axle speed signal 10 which is externally supplied to the inventive unit by an outside source, namely the speed pickup (not shown) as noted above. The axle speed signal 10 and axle rate signal 12 may be generated in a manner similar to that shown and disclosed in the above-noted U.S. Pat. No. 4,491,920.

With reference to the drawing, the presently preferred embodiment of this invention which utilizes a variable force reduction rate approach includes a rate band detector 14 which receives the above-noted axle rate signal 12. As previously noted, the axle rate signal 12 is the acceleration/deceleration rate of the wheel/axle being monitored for slippage, and is developed from the differentiation of the axle speed signal 10 externally supplied by speed pickup (not shown). The rate band detector 14 is adapted to receive the axle rate signal 12, and compare it to a deceleration rate level, which is programmed into the rate band detector 14 and is set to be indicative of the border line between a deceleration rate that the vehicle could actually produce without wheel slippage and any deceleration rate that is in the wheel slippage range. As a result of such comparison, the rate band detector 14 produces a first output logical signal 16 which will have a numerical value of "0" or "1". If the input axle rate signal 12 is less than or equal to −5.2 MPHPS (miles per hour per second) the output will be a logical signal 16 of "1". If the input axle rate signal 12 is greater than −5.2 MPHPS the output will be a logical signal 16 of "0". An output logical signal 16 of "1" indicates that the axle deceleration is in the slippage range, while an output logical signal 16 of "0" indicates that the axle deceleration is not in the slippage range.

In addition to the above, an energy summation means 18 is also provided which is responsive to the output logical signal 16 and the axle rate signal 12, to produce an energy summation output signal 20, which is equal to "SUM". The energy summation means 18 is adapted to receive the axle rate signal 12 and add it to +5.2 MPHPS and then to include the value into a memory within the energy summation means 18. If the rate band detector 14 indicates that the axle deceleration is in the slippage range, the value of the summation will be carried into the next program cycle. The value in the memory of the energy summation means 18, will be set to 0 if the input from the rate band detector 14; i.e., output logic signal 16, indicates that the axle deceleration is not in the slippage range. Accordingly, the value in the memory of the energy summation means 18 is representative of the wheel/axle set's loss of energy due to braking wheel slippage, and will be either 0 or a negative value. The more negative the value, the greater the energy loss. The energy summation output signal 20, as a function of the two input signals 12 and 16 to such energy summation means 18, will vary as follows: If the logical signal 16 is a logical "1", the mathematical process that will occur is $$SUM = SUM + (axle\ rate + 5.2\ MPHPS)$$

On the other hand, if the logical signal 16 is a logical "0", then $$SUM = 0$$

In addition to the above, the system of this invention also includes the function of determining an energy constant, or an energy constant determination means 22 responsive to the axle speed signal 10 to produce an energy constant signal 24 defining an energy loss limit. As previously noted, the axle speed signal 10 is externally supplied by the speed pickup (not shown) and is a value representative of the speed of the wheel/axle set being monitored. The input speed signal 10 is used to compute the energy constant signal 24, and utilizes an equation which defines the energy loss limit at which wheel slippage has little potential for self correction. As the vehicle speed increases, the energy loss limit becomes greater as the nature of wheel to rail slippage would dictate. The energy constant signal 24 will always have a negative value, and as the axle speed increases; i.e. axle speed signal 10 increases, the value of the energy constant signal 24 will become more negative. Accordingly, the energy constant signal 24 is defined in terms of the input signal (axle speed signal 10) as follows:

Energy constant signal=$-0.0053$(axle speed**2)$-8$, and has a numerical value which is always negative.

A slip detector 26, is also provided within the inventive system which is responsive to the energy summation signal 20 and the energy constant signal 24 to produce a second logical signal 28 of "0" or "1". As previously noted, the energy summation signal 20 will be a negative number or zero, while the energy constant signal 24 will always have a negative value, which becomes more negative with increasing axle speeds. On the basis of comparing these two values, the slip detector 26 produces a slip enable output signal 28, which indicates to all other logic functions connected thereto, that the axle is in a slip condition that must be corrected, and functions as follows: If the energy summation signal 20 is less than or equal to the energy constant signal 24, the second logical signal 28 will be a logical "1". If the energy summation signal 20 is greater than the energy constant signal 24, the second logical signal 28 will be a logical "0".

A wheel slip (w/s) intensity detector 30 is also provided which is responsive to axle rate signal 12, the energy summation signal 20 and the second logical signal 28, to produce a wheel slip intensity output signal 32. The wheel slip intensity detector 30, is adapted to hold in memory the axle deceleration rate at the point where slip is detected. If the axle rate signal 12 is negative, it is decelerating, and the more negative the rate, the faster breakaway of the slip; i.e., lower intensity, and accordingly the lower the intensity output signal 32. On a typical system, the axle rate value indicating the intensity, could theoretically be anywhere between $-5.2$ MPHPS and $-25.6$ MPHPS. If the input energy summation signal 20 is zero, then the intensity output signal 32 will be zero. If the input energy summation signal 20 is not zero, then the following will result: If the input second logical signal 28 transitions from a logical "0" to a logical "1", then the intensity output signal 32 will equal the input axle rate (i.e., axle rate signal 12). If the input second logical signal 28 remains constant in either state, positive or negative, or transitions from a logical "1" to a logical "0", then the intensity output signal 32 will remain unchanged from the previous determination. The overall effect of this function is that the intensity output signal 32 will be either 0 or the axle deceleration rate value at the time the second logical signal transitions from a logical "0" to a logical "1".

A release rate determination means 34 is also provided which is responsive to the wheel slip intensity detector 30, i.e., wheel slip intensity output signal 32, to convert the wheel slip intensity output signal 32 to a command signal 36 which is then utilized to vary the rate of braking force reduction through a brake force modulation interface 38. The wheel slip intensity signal 32 will be either a numerical 0 or a numerical value between $-5.2$ MPHPS and $-25.6$ MPHPS. The lower this value (more negative), the faster the breakaway slow breakaway wheel slip is more effectively controlled by a slow brake force reduction. On the other hand effectiveness and wheel protection make a rapid brake force reduction an imperative for fast breakaway wheel slips, While a number of different devices can he utilized as a brake force modulation interface 38 to he responsive to the command signal 36 to vary the brake force reduction, for purposes of example, a variable flow modulation valve can he utilized for this purpose, If such a flow modulation valve is used, the release rate determination means 34 will convert the wheel slip intensity signal 32 to command signal 36 which is a varying current signal used to drive the variable flow modulation valve, The variable flow modulation valve operates in the following manner:

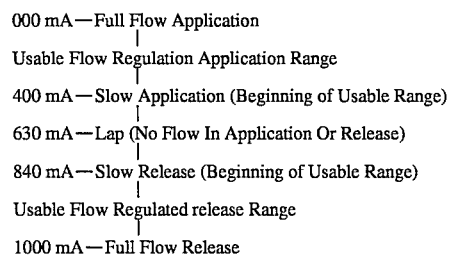

The input to the release rate determination means 34 from the wheel slip intensity detector, i.e., intensity output signal 32, will be either 0 or an axle rate signal 12 in the range from $-5.2$ MPHPS to $-25.6$ MPHPS. With regard to the above described variable flow modulation valve, if the input (intensity output signal 32) is 0, the output command signal 36 will be 630 mA current (a lap condition). If the input intensity output signal is in the −5.2 to −5.6 MPHPS range, the following equation is used to determine the output command signal 36:

Output Command Signal=−7.84* Input+799.23.

Accordingly, the variable flow modulation valve will control the brake force reduction through the variable command signal 36 provided in the form of a variable mA current signal.

While a number of presently preferred embodiments of the invention have been described in detail above with reference to the attached drawing Figure, it should be understood that the embodiments described are an example of apparatus as may be used in a variable force reduction rate approach, and a number of modifications and/or other adaptations of the present invention may be made by persons who are skilled in the passenger transit type braking art utilizing different types of slip control logic and a variety of other force modulation systems without departing from either the spirit of the invention or the scope of the appended claims.

We claim:

1. A method of controlling wheel slip in a passenger transit type railway vehicle brake system, said method comprising the steps of:

(a) monitoring a speed of a wheel/axle set to produce an axle speed signal indicative of said speed of said wheel/axle set being monitored, and an axle rate signal indicative of acceleration/deceleration of said wheel/axle set being monitored;

(b) determining whether said axle rate is in a slippage range, and generating a first output logical signal indicative of whether said axle rate is in said slippage range;

(c) comparing said axle rate and said first output logical signal to determine an energy summation value indicative of said wheel/axle set's loss of energy due to braking wheel slippage, and generating an energy summation signal;

(d) determining an energy loss limit on a basis of said axle speed signal, and generating an energy loss limit signal at which wheel slippage has little potential for self correction, said energy loss limit signal having numerical value no greater than zero;

(e) comparing said energy summation signal and said energy loss limit signal to determine a slip enablement output indicative of whether said wheel/axle set being monitored is in a slip condition that must be corrected, and generating a second logical signal indicative of whether such correction is needed;

(f) comparing said axle rate signal, said energy summation signal and said second logical output signal to determine wheel slip intensity, and generating a wheel slip intensity signal which has a numerical value equal to said axle rate if said second logical output signal transitions from an indication that no wheel slip correction is needed to an indication that a wheel slip correction is needed, and which has an unchanging value if said second logical output signal remains unchanged or transitions from an indication that wheel slip correction is needed to an indication that no wheel slip correction is needed;

(g) converting said wheel slip intensity signal to a command signal; and (h) utilizing said command signal in a force modulation interface to vary a rate of braking force reduction.

2. A method of controlling wheel slip in a passenger transit type railway vehicle brake system, according to claim 1, wherein said axle rate signal determined in step (a) is determined by differentiation of said axle speed signal.

3. A method of controlling wheel slip in a passenger transit type railway type vehicle brake system, according to claim 1, wherein said command signal generated in step (g) is in a form of a variable mA current signal, and said force modulation interface in step h includes a variable flow modulation value responsive to said variable mA current signal.

4. A method of controlling wheel slip in a passenger transit type railway vehicle brake system, according to claim 3, wherein said command signal generated in step (g) will have a value of 630 mA if said wheel slip intensity signal is 0, or a value of −7.84 times a value of said wheel slip intensity signal, generated in step (f), plus 799.23.

5. A method of controlling wheel slip in a passenger transit type railway vehicle brake system, according to claim 1, wherein said determination of whether said axle rate is in said slippage range, made in step (b), is accomplished by comparing said axle rate signal to a predetermined deceleration/rate level which is indicative of a border line between a deceleration rate that such vehicle could actually produce without wheel slippage and any deceleration rate that is within said wheel slippage range.

6. A method of controlling wheel slip in a passenger transit type railway vehicle brake system, according to claim 5, wherein said first logical output signal, generated in step (b), will indicate that said axle rate is in said slippage range if said axle rate is less than or equal to −5.2 MPHPS, and will indicate that said axle rate is not in said slippage range if said axle rate is greater than −5.2 MPHPS.

7. A method of controlling wheel slip in a passenger transit type railway vehicle brake system, according to claim 1, wherein said energy summation signal, generated in step (c), has a value equal to 0 if said first logical output signal indicates that said axle rate in not in said slippage range, and has a value equal to said axle rate plus 5.2 MPHPS if said first logical output signal indicates that said axle rate is in said slippage range.

8. A method of controlling wheel slip in a passenger transit type railway vehicle brake system, according to claim 1, wherein said second logical signal, generated in step (e), will indicate that wheel slip correction is needed if said energy summation signal, generated is step (c), is less than or equal to said energy loss limit signal, generated in step (d), and will indicate that wheel slip correction is not needed if said energy summation signal, generated is step (c), is greater than said energy loss limit signal, generated in step (d).

9. A method of controlling wheel slip in a passenger transit type railway vehicle brake system, according to claim 1, wherein said wheel slip intensity signal, generated in step (f), has a value of 0 if said energy summation signal, generated in step (c), is 0, and if said energy summation signal is not 0, said wheel slip intensity signal, generated in step (f), will be equal to said axle rate if said second logical output signal, generated in step (e), transitions from an indication no slips are indicated to an indication that slips are indicated, or will remain unchanged if said second logical output signal, generated in step (e), transitions from an indication that slips are indicated to an indication that no slips are indicated.

10. A method of controlling wheel slip in a passenger transit type railway vehicle brake system, according to claim 1, wherein said wheel slip intensity signal has a numerical value of 0 or a numerical value between −5.2 and −25.6 MPHPS.

11. A slip control system for a passenger transit type railway vehicle brake system, said slip control system comprising:

(a) a means for monitoring a speed of a wheel/axle set to produce an axle speed signal indicative of said speed of such wheel/axle set being monitored, and an axle rate signal indicative of acceleration/deceleration of such wheel/axle set be monitored;

(b) a means for determining whether said axle rate signal is in a slippage range, and generating a first output logical signal indicative of whether said axle rate signal is in said slippage range;

(c) a means for comparing said axle rate signal and said first output logical signal to determine an energy summation value indicative of such wheel/axle set's loss of energy due to braking wheel slippage, and generating an energy summation signal;

(d) a means for determining an energy loss limit on a basis of said axle speed signal, and generating an energy loss limit signal at which wheel slippage has little potential for self correction, said energy loss limit signal having a numerical value no greater than zero;

(e) a means for comparing said energy summation signal and said energy loss limit signal to determine a slip enablement output indicative of whether such wheel/axle set being monitored is in a slip condition that must be corrected, and generating a second logical signal indicative of whether such correction is needed;

(f) a means for comparing said axle rate signal, said energy summation signal and said second logical output signal to determine wheel slip intensity, and generating a wheel slip intensity signal which has a numerical value equal to said axle rate signal if said second logical output signal transitions from an indication that no wheel slip correction is needed to an indication that wheel slip correction is needed, and which has an unchanging value if said second logical output signal remains unchanged or transitions from an indication that wheel slip correction is needed to an indication that no wheel slip correction is needed;

(g) a means for converting said wheel slip intensity signal to a command signal; and (h) a force modulation interface responsive to said command signal to vary a rate of braking force reduction.

12. A slip control system for a passenger transit type railway vehicle brake system, according to claim 11, wherein said command signal, generated by said means for converting said wheel slip intensity signal to a command signal, is in a form of a variable mA current signal, and said force modulation interface responsive to said command signal includes a variable flow modulation valve responsive to said variable mA current signal.

13. A slip control system for a passenger transit type railway vehicle brake system, according to claim 11, wherein said means for determining whether said axle rate is in said slippage range, and generating said first logical output signal indicative of whether said axle rate is in said slippage range is a rate band detector responsive to said axle rate and a deceleration rate level set to be indicative of a border line between a deceleration rate that such vehicle can actually produce without wheel slippage and any deceleration rate that is in said wheel slippage range.

14. A slip control system for a passenger transit type railway vehicle brake system, according to claim 11, wherein said means for comparing said energy summation signal and said energy loss limit signal to determine a slip enablement output indicative of whether said wheel/axle set being monitored is in a slip condition that must be corrected and generating a second logical output signal indicative of whether said wheel/axle set being monitored is in a slip condition that must corrected comprises a slip detector.

15. A slip control system for a passenger transit type railway vehicle brake system, according to claim 11, wherein said means for comparing said axle rate signal, said energy summation signal and said second logical output signal to determine wheel slip intensity and generating said wheel slip intensity signal comprises a wheel slip intensity detector and said wheel slip intensity signal has a value of 0 if said energy summation signal is 0, and if said energy summation signal is not 0, said wheel slip intensity signal will be equal to said axle rate if said second logical output signal transitions from an indication that slip correction is needed to an indication that slip correction in not needed, and will remain unchanged if said second logical output signal transitions from an indication that slip correction is needed to an indication that slip correction is not needed.

16. A slip control system for a passenger transit type railway vehicle brake system, according to claim 11, wherein said wheel slip intensity has a numerical value between −5.2 and −25.6 MPHPS if said energy summation signal is not 0.

17. A slip control system for a passenger transit type railway vehicle brake system, said slip control system comprising:

(a) a means for monitoring a speed of a wheel/axle set to produce an axle speed signal and an axle rate signal;

(b) a rate band detector responsive to said axle rate signal and a deceleration rate signal, to produce a first logical output signal indicative of whether said axle rate signal is in a slippage range;

(c) an energy summation means responsive to said first logical output logical signal to produce an energy summation signal;

(d) an energy constant means responsive to said axle speed signal to determine an energy loss limit value indicative of a loss of energy due to braking wheel slippage of such wheel/axle set being monitored, and to produce an energy loss limit signal defining an energy loss limit value;

(e) a slip detector, responsive to said energy summation signal to determine whether such wheel/axle set being monitored is in a slip condition that must be corrected, and to produce a second logical signal indicative of whether such correction is needed;

(f) a wheel slip intensity detector responsive to said axle rate signal, said energy summation output signal, and said second logical output signal, to produce a wheel slip intensity signal having a value of "0" if said second logical output signal indicates that no correction is needed, and if said second logical signal indicates that correction is needed, said intensity output signal will have a value equal to said axle rate signal;

(g) a release rate determination means responsive to said intensity output signal to convert said intensity output signal to a command signal; and (h) a force modulation interface responsive to said command signal to vary the a rate of braking force reduction.

18. A slip control system, according to claim 17, wherein said means for monitoring such speed of such wheel/axle set comprises a speed sensor which measures an axle speed of such wheel/axle set and which determines said axle rate by differentiation of said axle speed.

19. A slip control system, according to claim 17, wherein said force modulation interface includes a variable flow modulation valve responsive to said release rate determination means and said command signal is a varying current signal used to drive said variable flow modulation valve.

20. A slip control system, according to claim 17, wherein said rate band detector is responsive to said axle rate and a deceleration rate level set to be indicative of a border line between a deceleration rate that such vehicle can actually produce without wheel slippage and any deceleration rate that is in a wheel slippage range.

* * * * *

UNITED STATES PATENT AND TRADEMARK OFFICE
CERTIFICATE OF CORRECTION

PATENT NO. : 5,471,387
DATED : November 28, 1995
INVENTOR(S) : James A. Woods et al.

It is certified that error appears in the above-indentified patent and that said Letters Patent is hereby corrected as shown below:

Column 1, line 32, delete "a".
Column 2, line 53, after 1, insert a comma.
Column 4, line 21, delete "barking" and insert --braking--;
column 4, line 34, delete "of";
column 4, line 34, after "one", insert --of--.
Column 6, line 35, before "slow", insert --.A--;
column 6, line 39, delete the comma and insert a period;
column 6, line 40, delete "he" and insert --be--;
column 6, line 41, delete "he" and insert --be--;
column 6, line 44, delete "he" and insert --be--;
column 6, line 44, delete the comma and insert a period;
column 6, line 48, delete the comma and insert a period.
Column 7, line 2, delete "-5.6" and insert ---25.6---.
Column 8, line 11, delete "value" and insert --valve--;
column 8, line 39, delete "in", first occurance, and insert --is--;
column 8, line 47, delete "is", first occurance, and insert --in--;
column 8, line 50, delete "is", first occurance, and insert --in--.
Column 10, line 8, after must, insert --be--;
column 10, line 20, delete "in" and insert --is--;
column 10, line 65, delete "the".

Signed and Sealed this

Thirtieth Day of April, 1996

Attest:

BRUCE LEHMAN

Attesting Officer    Commissioner of Patents and Trademarks